United States Patent [19]

Nagira et al.

[11] Patent Number: 4,760,405

[45] Date of Patent: Jul. 26, 1988

[54] METHOD AND APPARATUS FOR RECORDING AN IMAGE

[75] Inventors: Keiji Nagira; Shoji Kanemura, both of Kawasaki, Japan

[73] Assignee: Canon Kabushiki Kaisha, Tokyo, Japan

[21] Appl. No.: 920,797

[22] Filed: Oct. 20, 1986

[30] Foreign Application Priority Data

| | | | |
|---|---|---|---|
| Oct. 22, 1985 | [JP] | Japan | 60-235839 |
| Oct. 22, 1985 | [JP] | Japan | 60-235840 |
| Oct. 23, 1985 | [JP] | Japan | 60-236956 |
| Nov. 7, 1985 | [JP] | Japan | 60-249591 |
| Nov. 25, 1985 | [JP] | Japan | 60-264189 |

[51] Int. Cl.[4] .......... G01D 9/00

[52] U.S. Cl. .......... 346/1.1; 346/76 PH; 400/120; 400/225; 400/231; 400/233

[58] Field of Search .......... 346/76 PH, 1.1; 400/120, 231, 225, 233

[56] References Cited

U.S. PATENT DOCUMENTS

| | | | |
|---|---|---|---|
| 4,044,883 | 8/1977 | Boehmer | 400/225 |
| 4,511,903 | 4/1985 | Miyazaki et al. | 346/76 PH |
| 4,642,658 | 2/1987 | Arakawa | 346/105 |

FOREIGN PATENT DOCUMENTS

| | | |
|---|---|---|
| 51010 | of 1974 | Japan . |
| 112415 | of 1977 | Japan . |
| 34934 | of 1980 | Japan . |
| 67494 | of 1983 | Japan . |
| 48380 | of 1985 | Japan . |
| 48379 | of 1985 | Japan . |
| 24988 | of 1985 | Japan . |
| 24987 | of 1985 | Japan . |
| 58768 | of 1986 | Japan . |
| 48388 | of 1986 | Japan . |
| 1388335 | of 1975 | United Kingdom . |

*Primary Examiner*—A. D. Pellinen
*Assistant Examiner*—Morris Ginsburg
*Attorney, Agent, or Firm*—Fitzpatrick, Cella, Harper & Scinto

[57] ABSTRACT

Method and apparatus for effecting thermal recording on a sheet of a recording medium with the aid of a reusable ribbon which can be repeatedly used for recording a plurality of times. The recording operation is performed during forward movement as well as during return movement of a thermal head while the ink ribbon is wound and unwound. On completion of a predetermined number of recording operations in both direction further recording is stopped and the thermal head is returned to its home position without any displacement of the ink ribbon. Thereafter, the above-mentioned steps are repeated. The reusable ribbon is wound by a length equal to M/N of a line every time recording is performed on M lines in the two-way recording mode, where N represents the number of recording operations for which a portion of the reusable ink ribbon can be repeatedly used. When a non-reusable ink ribbon is used, this fact is detected and the result of detection is discriminated by a CPU to effect unidirectional recording; when a reusable ink ribbon is used, this fact is detected to effect irregular two directional recording, and when no ink ribbon is used, this fact is detected to effect complete two directional recording.

4 Claims, 13 Drawing Sheets

FIRST SET NUMBER : 8
SECOND SET NUMBER : 11

METHOD AND APPARATUS FOR RECORDING AN IMAGE

BACKGROUND OF THE INVENTION

1. Field of the Invention

The present invention relates to method and apparatus for recording an image on a sheet of a recording medium in the both-way recording mode with the aid of a multi-ink sheet which can be repeatedly used for recording operations. More particularly, the present invention relates to method and apparatus for recording an image on sheet material which is used for electronic typewriters, facsmile apparatus, thermal printers or the like. Further, the present invention relates to method and apparatus for effectively performing recording operation on a sheet of recording medium in the both-way recording mode with the aid of a multi-ink sheet which can be used for recording operations a plurality of times and which recording operation can be performed repeatedly.

2. Related Background Art

Generally, a recording apparatus such as printer, facsmile or the like is so constructed that recording is achieved on sheet material (plain paper, plastic film, cloth or the like recording medium) by displacing a recording head in response to a printing data signal. Among conventional recording apparatuses a serial type adapted to carry out main scanning by means of the recording head is widely put in practical use.

Further, as recording process an ink jet type, a wire dot type, a thermal type or the like are well known.

Among various recording processes as mentioned above the thermal type (which is embodied in the form of a thermal recording apparatus) is so constructed that dot forming means comprising a plurality of electricity-heated converting members (heating elements) are disposed in the operative area in front of a recording head (thermal head) and recording is achieved under the effect of heating by activating the dot forming means in response to printing data signal while it is displaced along sheet material in the pressure contact state at the time of recording operation.

Further, this kind of thermal recording apparatus can comprise a heat sensitive type in which recording is effected using a heat sensitive sheet (sheet material adapted to exhibit a certain color under the effect of heating) without any necessity for an ink ribbon, and a thermal transfer type in which transfer recording is achieved using plain sheet material with the aid of an ink ribbon. Moreover, the thermal transfer type is classified into two kinds, one of them being such that a one time ink ribbon on which recording is effected only by one time on the same area is used and the other one being such that a multi-ink ribbon with which recording operation can be repeatedly performed (for instance, 10 times) is used.

To actuate a conventional recording apparatus of the type using a multi-ink ribbon (in accordance with the thermal recording process), a method of effecting one-way recording in the same manner as in the case of a one time ink ribbon while the ink ribbon is wound only in the one direction is generally employed.

However, it has been pointed out as a problem inherent to the one-way recording that it is necessary to unwind the ink ribbon by a full length at every time when it is wound by a full length and the unwinding operation takes a long time, resulting in the recording operation being achieved at a slow speed. After completion of the winding operation by a full length a ribbon cassette may be manually turned upside down by an operator. However, this means that the recording operation cannot be performed automatically.

SUMMARY OF THE INVENTION

Hence, the present invention has been made with the foregoing background in mind.

It is an object of the present invention to provide a method and apparatus for effectively recording an image on a sheet of a recording medium.

It is another object of the present invention to provide a method and apparatus which assure that recording is achieved at an increased operational speed with the use of a multi-ink sheet.

It is another object of the present invention to provide a method and apparatus which assure that recording is achieved with a remarkable reduction of useless consumption of the multi-ink sheet.

It is further another object of the present invention to provide a method and apparatus which assure that in the case where recording is achieved with the use of a multi-ink sheet this fact is detected and thereby recording is automatically effected in the both-way recording mode.

To accomplish the above objects there is proposed according to one aspect of the present invention a method of effecting thermal recording on a sheet of a recording medium with the aid of a multi-ink sheet which can be used for recording operations a plurality of times, the method being characterized in that heating means for heating the multi-ink sheet is reciprocably displaced along the recording medium as the ink sheet is wound and unwound, recording operation is performed during forward movement as well as during return movement of the heating means, recording operation is stopped at the time of return movement at a predetermined time as counted from starting of recording operation in both the directions, the heating means is caused to return toward the start position without any displacement of the ink sheet and thereafter the steps of the operations as mentioned above are repeated.

Further, there is proposed according to another aspect of the present invention an apparatus for effecting thermal recording on a sheet of recording medium with the aid of a multi-ink sheet which can be used for recording operations a plurality of times, the apparatus being characterized in that the apparatus essentially comprises heating means for heating the multi-ink sheet to effect recording on the recording medium, means for reciprocably displacing the heating means along the recording medium, means for displacing the ink sheet to wind and unwind the latter, and means for controlling the means for displacing the heating means and the means for displacing the ink sheet in such a manner that the heating means is reciprocably displaced along the recording medium as the ink sheet is wound and unwound, recording operation is performed during forward movement as well as during return movement of the heating means, recording operation is stopped at the time of return movement at a predetermined time as counted from starting of recording operation in both the directions, the heating means is caused to return toward the start position without any displacement of the ink sheet and thereafter the steps of the operations as mentioned above are repeated.

Other objects, features and advantages of the present invention will become clearly apparent from reading of the following description which has been prepared in conjunction with the accompanying drawings.

BRIEF DESCRIPTION OF THE DRAWINGS

The accompanying drawings will be briefly described below.

FIGS. 8A and 8B are illustrative views each of which exemplifies the steps of operations when recording is achieved in accordance with the second embodiment of the present invention, wherein FIG. 8A shows the content of a ribbon control table and FIG. 8B shows a track of displacement of a thermal head.

DESCRIPTION OF THE PREFERRED EMBODIMENTS

Now, the present invention will be described in a greater detail hereunder with reference to the accompanying drawings which illustrate preferred embodiments thereof.

Figure 1A:
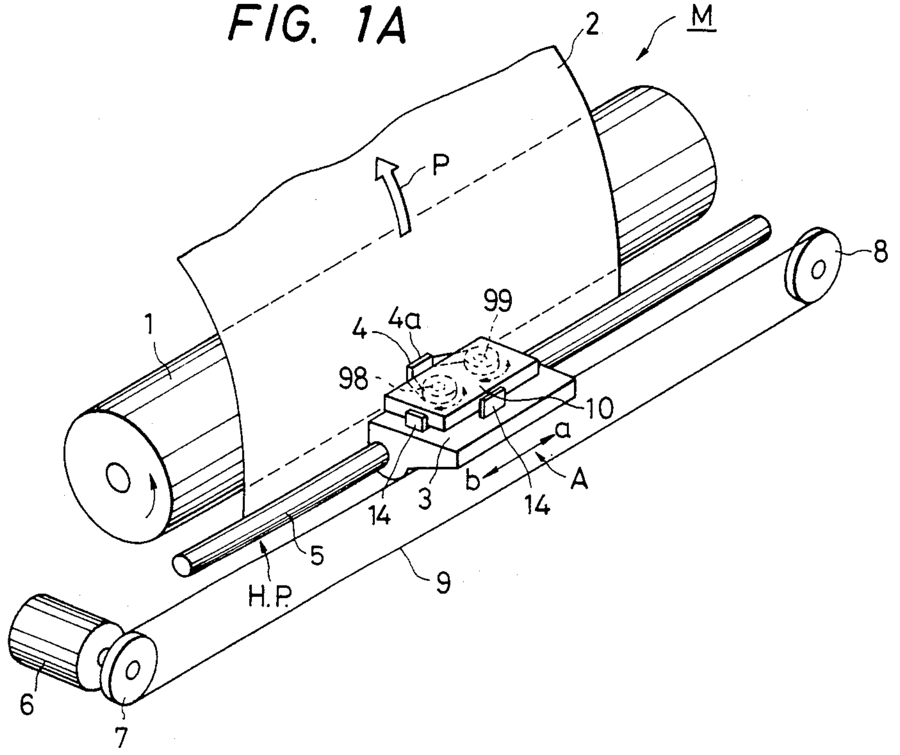
FIG. 1A is a fragmental perspective view of a serial type thermal recording apparatus in accordance with an embodiment of the present invention, particularly illustrating an essential part of the apparatus.

FIG. 1A is fragmentary perspective view of a serial type thermal recording apparatus in accordance with an embodiment of the present invention, particularly illustrating an essential part of the apparatus.

Specifically, the illustrated embodiment is concerned with a thermal recording method and apparatus of the type in which recording is achieved with the use of a multi-ink ribbon adapted to repeatedly carry out a recording operation while a thermal head is displaced along a sheet of a recording medium, wherein the aforesaid method and apparatus are characterized in that both way recording is achieved the number of times for which the multi-ink ribbon can be repeatedly utilized or by a certain odd number of times close to the first-mentioned number, and thereafter the thermal head is returned while the ink ribbon is kept in the unwound state and the above-mentioned steps of the operations are then repeated again.

The apparatus as shown in FIG. 1A is so constructed that recording is effected on a recording sheet 2 backed up by means of a platen 1 with the aid of a thermal head 4 which is mounted on a carriage 3. As is apparent from the drawing, the platen 1 is designed in the roller-shaped configuration and moreover it serves also as a sheet transferring roller.

The carriage 3 is mounted on a guide shaft 5 extended in parallel with the platen 1 so as to reciprocably move on the guide shaft 5 and it is reciprocably driven (in both the directions as identified by arrow marks A) by activating a driving system which comprises a stepping motor 6, a driving pulley 7, a driven pulley 8 and an endless belt 9 extended around both the driving and driven pulleys 7 and 8 and fixedly fastened to the carriage 3.

The thermal head 4 includes a plurality of heating elements **4*a* (for instance, 24 pieces of resistors arranged in two vertical lines as identified by $12\times2$ or 24 pieces of resistors arranged in a single vertical line) and it is turnably mounted to assume a down position where it is forcibly thrusted against the platen 1 with a multi-ink ribbon 13 to be described later and the sheet 2 interposed therebetween or at an up position where it is displaced away from the platen 1**.

A ribbon cassette 10 adapted to feed the multi-ink ribbon 13 to the operative position located in front of the thermal head 4 is detachably fitted onto the carriage 3. Incidentally, reference numeral 14 designates fitting means for detachably fitting the cassette 10 onto the carriage 3.

During the recording operation the multi-ink ribbon 13 is accommodated in the ribbon cassette 10 is wound in a predetermined direction by means of ribbon driving shafts 97 and 102 disposed in the carriage 3 in synchronization with the movement of the thermal head 4.

Next, a description will be made below as to a winding and unwinding mechanism for the ink ribbon 13 in the ink ribbon cassette 10 with reference to FIGS. 1B and 1C.

First, a description will be made as to the case of forward recording operation. (It should be noted that a plurality of arrow marks in FIG. 1B represent the direction of rotation of each of members constituting the mechanism during forward recording operation.)

In response to a signal transmitted from a central processing unit 20 (hereinafter referred to as CPU 20) a ribbon motor 26 is caused to rotate at a properly determined speed in the anticlockwise direction in synchronization with rotation of a carrier motor 23. Thus, an idler gear 91 is rotated in the clockwise direction via a motor gear 90 and another idler gear 92 is then rotated in the anticlockwise direction. This causes a planetary gear arm 94 which comes in pressure contact with the idler gear 92 under the effect of properly determined intensity of pressure with a friction spring 93 interposed therebetween to be rotated in the same direction as the idler gear 92 (in the anticlockwise direction). This leads to a result that a planetary gear 95 on a shaft 94*a* fixedly secured to the planetary gear arm 94 is brought in meshing engagement with a clutch gear 96 to rotate the latter in the anticlockwise direction. As the clutch gear 96 is rotated in that way, a winding clutch 97 which is operatively associated with the clutch gear 96 is caused to rotate. Accordingly, during a forward recording operation the ink ribbon 13 is unwound from a roller 99 until it is wound about a roller 98.

Figure 1B:
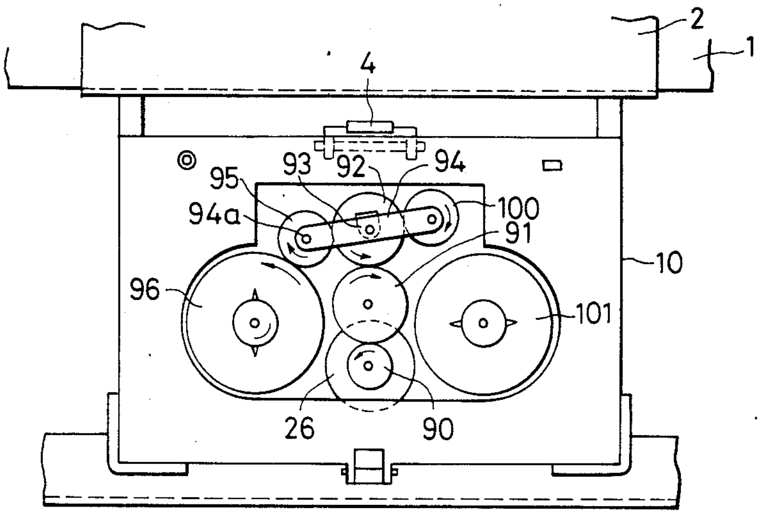
FIG. 1B is a schematic sectional plan view of a winding and unwinding mechanism for a multi-ink ribbon which is used for the apparatus as shown in FIG. 1A.
Figure 1C:
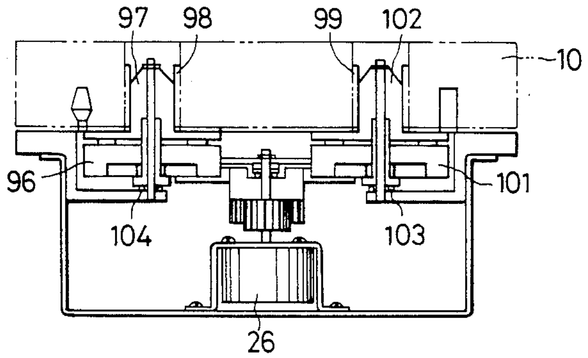
FIG. 1C is a schematic vertical sectional view of the winding and unwinding mechanism as shown in FIG. 1B.

As will be apparent from FIG. 1B, a planetary gear 100 located opposite to the planetary gear 95 assumes the inoperative position where it is displaced away from a clutch gear 101 during forward recording operation whereby a winding clutch 102 is not rotated by means of a motor 26. However, the winding clutch 102 is rotated as the ink ribbon wound about the roller 99 operatively connected to the winding clutch 102 is unwound therefrom. At this moment a properly determined intensity of back tension is imparted to the unwound ink ribbon under the influence of resilient force of the friction spring 103.

Next, a description will be made below as to the case of a return recording operation.

In response to a signal transmitted from CPU 20 the ribbon motor 26 is rotated in the clockwise direction whereby the direction of rotation of each of the abovementioned members becomes reverse to that in the case of forward recording operation. Specifically, the planetary gear 95 is displaced away from the clutch gear 96 and the planetary gear 100 is brought in meshing engagement with the clutch gear 101. As the winding clutch 97 is rotated in the clockwise direction, the ink ribbon 13 is unwound from the roller 98 and it is wound about the roller 99 during return recording operation. At this moment the clutch 97 serving as clutch on the supply side imparts to the ink ribbon a properly determined intensity of back tension under the effect of resilient force of the friction spring 104.

It should be noted that the present invention should not be limited only to the above-described embodiment. Alternatively, one may employ a method of imparting back tension to the ink ribbon within the interior of the ribbon cassette without any necessity of construction with which a certain intensity of back tension is imparted to the ink ribbon by means of each of the friction clutches. Further, in the illustrated embodiment a description is made as to the case where ribbon winding is achieved by rotation of a motor. Alternatively, one may employ the method of winding the ink ribbon under the effect of moving force of the carrier without any use of motor.

Figure 2:
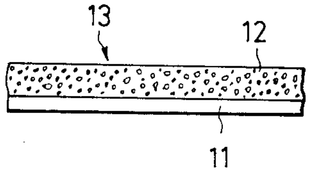
FIG. 2 is a fragmental enlarged sectional view of the multi-ink ribbon which is used for the apparatus as shown in FIG. 1A.

Next, a description will be made as to structure of a the multi-ink ribbon 13 with reference to FIG. 2 which illustrates an example of the same by way of a fragmentary enlarged sectional view. As is readily apparent from the drawing, the multi-ink ribbon 13 is so constructed that a mesh-shaped heat resistant porous absorption layer 12 is adhesively placed on a base 11 comprising polyester film or the like and the absorption layer 12 is then impregnated with thermally fusible ink to build an ink layer. Thus, a required ink ribbon with which a recording operation can be performed a predetermined number of times (for instance, 10 times) in the same area on the ink layer 12 is built in that way.

When a recording operation is performed, the thermal head 4 is displaced in parallel with the platen 1 while it is forcibly thrusted against the platen 1 with the sheet 2 and the ink ribbon 13 interposed therebetween and a plurality of heating elements 4*a* are then activated in response to printing data signal transmitted from CPU 20 to heat the thermal head 4. After completion of recording operation line shifting is effected by transferring the sheet 2 in the direction identified by an arrow mark P (see FIG. 1A).

It should be noted that the recording operation is performed in accordance with such an operational mode that both-way recording (reciprocable recording) is achieved an odd number of times (for instance, 9 times) which is close to the number of times (for instance, 10 times) the multi-ink ribbon 13 can be repeatedly utilized as long as possible, and thereafter the thermal head 4 is returned to its home position H.P. while the ink ribbon is kept in the unwound state (usually maintaining the head-up state) and the above-mentioned steps of the recording operations are repeated again from the position where the thermal head 4 is caused to return.

Specifically, when first forward recording is effected, a new ink ribbon 13 is unwound from the roller 99 to the roller 98 in the ink ribbon cassette 10 at substantially the same speed as moving speed of the thermal head 4. When first return recording is effected, a part of the ink ribbon 13 which has been used for forward recording is unwound from the roller 98 to the roller 99 at substantially the same speed as the moving speed of the thermal head 4. After the above-mentioned steps of the recording operations are repeated by a predetermined number of times, the ink ribbon 13 is not wound about the roller 99 any longer when return recording is effected at the predetermined number of times, and the thermal head 4 is returned to its home position H.P. without any performance of a recording operation (accompanied by heating). Now, the thermal head 4 is ready to start a second forward recording.

As will be apparent from the above description, a new part of the ink ribbon is fed to the operative area located in front of the thermal head 4 every time when the latter is returned its home position after completion of recording operations an odd number of times. As a result, the multi ink ribbon can be used economically with the minimized number of return movements.

Figure 3:
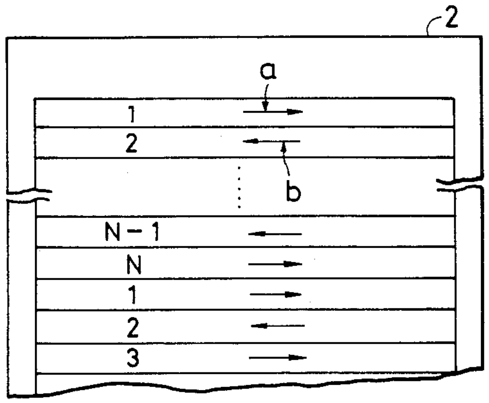
FIGS. 3 and 4 are an illustrative view respectively which exemplifies a recording operation mode of the apparatus in accordance with the first embodiment of the present invention.
Figure 4:
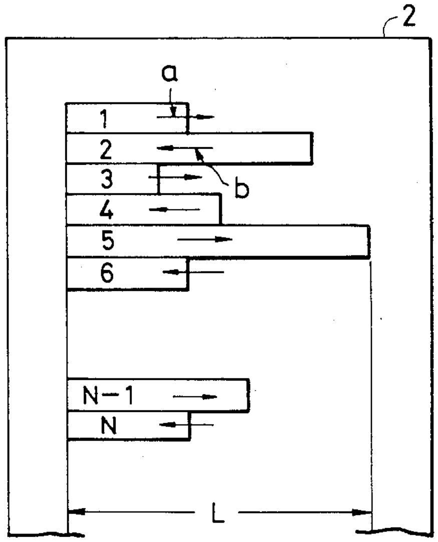

FIGS. 3 and 4 are illustrative views respectively which exemplify the recording operations as mentioned above.

In the case as illustrated in FIG. 3 both-way recording is the achieved on a sheet 2 (that is, recording operation is performed when the thermal head 4 is displaced in the direction as identified by an arrow mark a as well as when it is displaced in the direction as identified by an arrow mark b) while the thermal head 4 carries out full scanning (full width scanning) across each of the lines on the sheet 2. After completion of the recording operations an odd number of times (by the odd number of lines) (for instance, 9 times, that is, N=9) which is close to the number of times of recording operations for which the multi-ink ribbon can be repeatedly utilized as long as possible (for instance, 10 times), the thermal head 4 is returned (in the leftward direction in the illustrated example) while the ink ribbon is kept in the unwound state. Thus, next both-way recording is ready to start for full scanning with a new part of the ink ribbon.

In the case as illustrated in FIG. 4 full scanning is not effected for each of the lines on the sheet 2 but both-way recording is achieved while checking the extent of practical recording for each of the lines. At the time when recording operations are performed an odd number of times (for instance, 9 times, that is, N=9) which is close to the number of recording operations for which the multi-ink ribbon can be repeatedly utilized as long as possible (for instance, 10 times), the ink ribbon is wound by the maximum length of L (which is equal to the longest distance of line) and thereafter the thermal head is returned (in the leftward direction as seen in the drawing) while the ink ribbon is kept in the unwound state. Now, next both-way recording is ready to start with a new part of the ink ribbon.

The recording operation as illustrated in FIG. 4 is employed, recording speed and economical performance of the ink ribbon can be improved compared with the case where full scanning is achieved as illustrated in FIG. 3.

Figure 5:
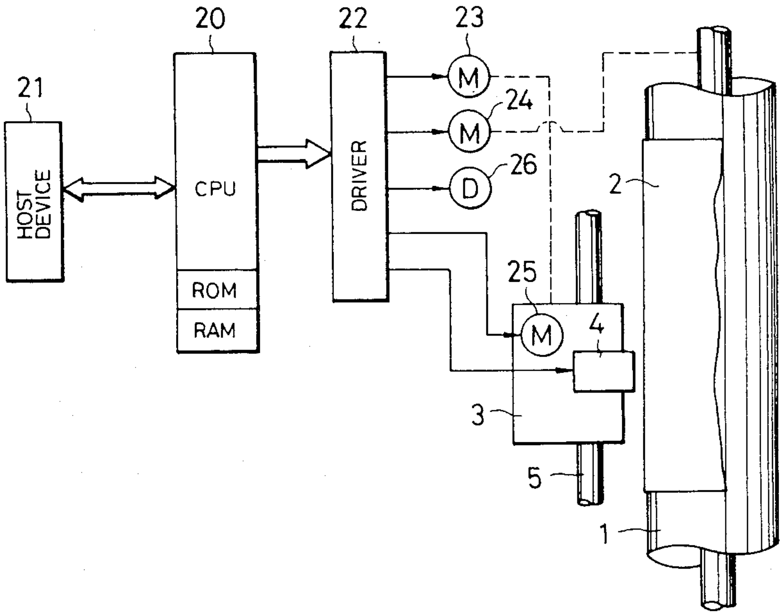
FIG. 5 is a block diagram illustrating a control system which is preferably employable for practicing the first embodiment of the present invention.

FIG. 5 is block diagram illustrating a control system for practicing the thermal recording method as described above.

As shown in FIG. 5, CPU (microprocessor) 20 in the recording apparatus is electrically connected to a host 21 such as computor, word processor or the like to receive printing data signals and necessary command signals therefrom.

CPU 20 is operatively connected to a motor 23 for driving the carriage 3, a motor 24 for transferring the sheet 2 (that is, for driving the platen 1), a motor 25 for turning up and down the thermal head and a motor 26 for driving the ink ribbon or means for actuating the ink ribbon winding mechanism via a driver (driving circuit) 22 to control them. Further, CPU 20 is adapted to actuate (heat) dot forming means (heating elements 4*a*) in the thermal head 4 in response to printing data signals transmitted from the host 21.

The recording operation is controlled in accordance with a program stored in ROM which is disposed adjacent to CPU 20.

Figure 6:
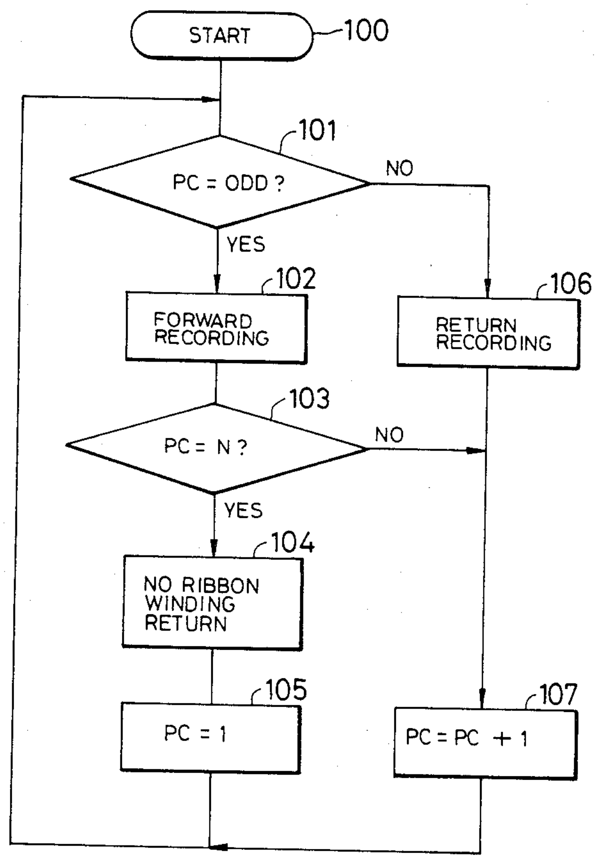
FIG. 6 is a flow chart illustrating the steps of operations of the control system in FIG. 5.

Referring to FIG. 6, when the recording apparatus is activated at Step 100, one proceeds to Step 101 at which it is discriminated whether both-way recording is effected an odd number of times or not (that is, it is effected at the even number of times). When it is found that it is effected an odd number of times, one proceeds to Step 102 at which forward recording is effected (usually from the left to the right). On completion of forward recording one proceeds to Step 103 at which it is discriminated whether the number of recording operations reaches a predetermined odd number (N) or not.

When it is discriminated at Step 103 that it reaches the predetermined odd number (for instance, 9 times), one proceeds to Step 104 at which the thermal head 4 (carriage 3) is returned along the return path (usually from the right to the left) while the ink ribbon is kept in the unwound state, that is, the motor 26 is not driven and the thermal head 4 is not activated to heat up. On completion of return movement of the thermal head 4 Step 105 is reached at which the number of recording operations is reset to a first one. As a result, one returns to Step 101.

On the other hand, when it is discriminated at Step 101 that the number of recording operations is a certain even number, one proceeds to Step 106 at which return recording is effected. When return recording is completed, the number of recording operations is counted up at Step 107. Then, one returns to Step 101.

When it is discriminated at Step 103 that the number of recording operations does not reach a predetermined one (N times in odd number), one proceeds to Step 107 at which the number of recording operations is counted up in the same manner as mentioned above. Then, one returns to Step 101.

Incidentally, in the case where the number of recording operations for which the multi-ink ribbon 13 can be repeatedly utilized as long as possible is a certain odd number, the carriage 3 is returned to its home position H.P. while the ink ribbon is kept in the unwound state and the thermal head assumes the up position, after recording operation is achieved by the aforesaid odd number of times. Thereafter, both-way recording is repeated again.

As will be readily understood from the above description, the recording apparatus of the invention is so constructed that both-way recording is effected by the number of recording operations for which the multi-ink ribbon can be repeatedly utilized or by a certain odd number of times which is close to the first-mentioned number (which is usually equal to the number of lines), thereafter the thermal head 4 is returned while the ink ribbon is kept in the unwound state (usually, the carriage 3 is returned while the thermal head 4 assumes the up position) and the above-mentioned steps are repeated again. As a result, the minimized number of return movements of the thermal head and an increased recording speed are assured.

Advantageous features of the invention are that there is no necessity for the ribbon cassette to be manually inverted for rewinding, the ink ribbon can be fed automatically and the apparatus has excellent maneuverability.

Other advantageous features of the invention are that the multi-ink ribbon can be utilized without any substantial loss by setting the number of both-way recording operations at or helon the number of recording operations for which the ink ribbon can be repeatedly utilized as long as possible or a certain number of times (an odd number of times) which is close to the first-mentioned number and thereby economical performance of the ink ribbon can be maintained satisfactorily.

Accordingly, there are provided thermal recording method and apparatus which assure that a recording speed can be increased for a serial type thermal transfer recording apparatus in which a multi-ink ribbon is accommodated and the apparatus has excellent maneuverability.

Next, a description will be made below as to another embodiment of the invention.

This embodiment is concerned with recording method and apparatus of the type in which a ribbon control table is provided which comprises a plurality of sections corresponding to the position of each of predetermined ranges on a multi-ink ribbon and has fore and rear margins and reference positions, a recording operation is performed while shifting the existing recording mode to a predetermined mode selected from both-way recording mode, forward recording mode and return recording mode in dependence on the recording conditions, the number of recording operations in each of the sections is stored and when the number of recording operations in any one of the sections in the ribbon control table reaches a predetermined one, the ribbon control table is shifted so as to allow the section to be located at the fore margin whereby loss in consumption of the ink ribbon is minimized.

It should be noted that the same recording apparatus as illustrated in FIG. 1A is employed to practice this embodiment of the invention with the exception of manner of controlling.

FIG. 7 exemplifies the structure of RAM in a control device for practicing the embodiment of the invention.

Figures 7A, 7B, 7C:
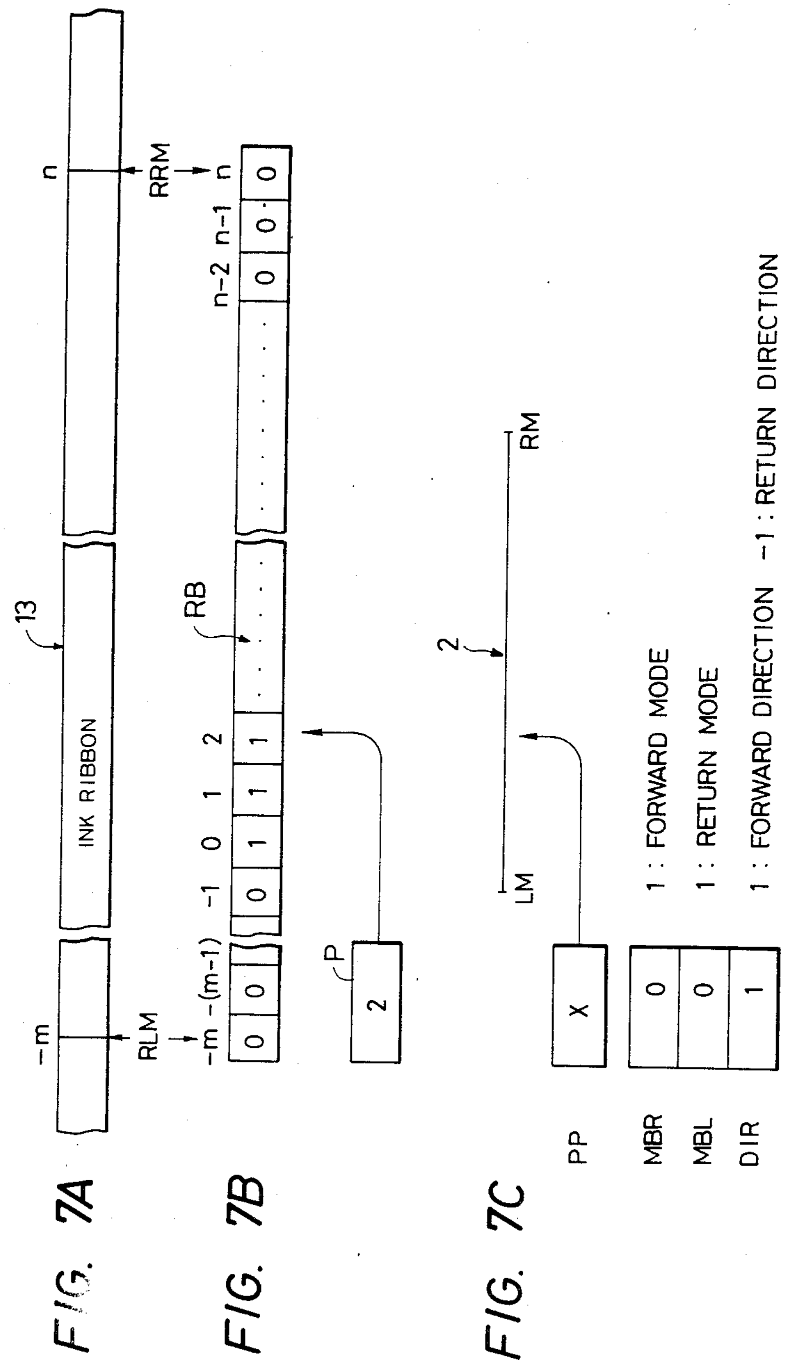
FIGS. 7A to 7C are illustrative views which exemplify the structure of a buffer memory for controlling operations of the recording method in accordance with other embodiment of the present invention.

As illustrated in FIG. 7(B), a ribbon buffer RB including a plurality of sections −m—0—n is provided in the RAM each of which corresponds to each of the positions on a predetermined range on the multi-ink ribbon 13 as illustrated in FIG. 7(A), that is, the range as defined between ribbon left margin RLM and ribbon right margin RRM. Thus, a ribbon control table as illustrated in FIG. 8 is prepared.

The ribbon buffer RB includes a fore margin (left margin) −m, rear margin (right margin) n and a reference point 0 whereby the section which is recorded during a recording operation by means of pointer P can be identified.

Further, the RAM is provided with a plurality of buffer memories which represent position PP of the carriage 3 (thermal head 4) on the sheet 2 and recording operation modes MBR, MBL, DIR or the like, as illustrated in FIG. 7(C).

The memory PP represents the position of the carriage 3 on the sheet 2 between the left margin LM and the right margin RM. The memory MBR represents a recording mode in the forward direction (in the rightward direction) in the operational state where the section 1 is assumed, the memory MBL represents a recording mode in the return direction (in the leftward direction) in the operational state where the section 1 is assumed and both the memories MBR and MBL perform in a both-way recording mode in the operational state where the section 0 is assumed. Further, the memory DIR is adapted to drive the carriage in the forward direction in the operational state where the section 1 is assumed, while it is adapted to drive it in the return direction in the operational state where the section-1 is assumed.

Figure 8A:
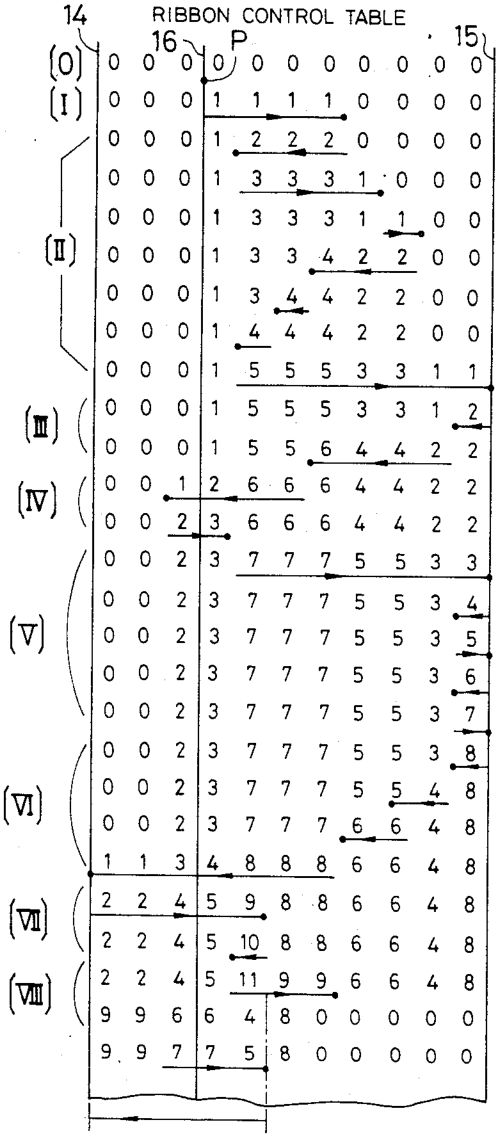
Figure 8B:
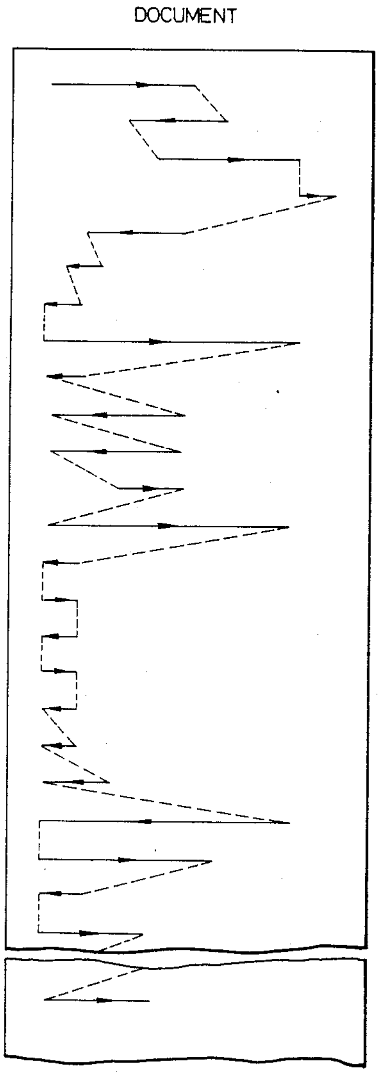

The embodiment of the invention consists in that the recording method can be controlled with the use of the buffer memory as described above. FIGS. 8(A) and 8(B) concretely illustrate an example of practicing the thermal recording method in accordance with the embodiment of the invention respectively, while taking into account the content of the ribbon control table and movement of the thermal head 4.

Specifically, FIG. 8(A) shows a ribbon control table (a table which represents the existent position of the ribbon, the number of times of utilization of the latter and the existent utilization position on the ribbon) comprising a plurality of sections each of which corresponds to the position of a predetermined range on the multi-ink ribbon 13 and having a margin 14 on the fore side (left side), a margin 15 on the rear side (right side) and a reference point 16. On the other hand, FIG. 8(B) shows by way of an example how the thermal head moves on a sheet (document) during the recording operation.

As will be apparent from the drawing, the reference point 16 is located at the position leftwardly of the central part of the ribbon control table (leftwardly of the latter) and at the initial state (0) the number of times of utilization of each of the sections amounts to zero while the pointer P is held at the reference point.

Recording is effected in the both-way recording mode by which recording starts from the state (I) in the rightward (forward) direction and numeral 1 is added at the position where the ink ribbon is used. At this moment the pointer P is displaced by the distance in which utilization of the ink ribbon is achieved.

When both-way recording mode is employed, the pointer is displaced from the existent position to one of the left and right ends on the next line which is located closer to the existent position and thereafter recording is effected, as exemplified by the state (II). In the case where distance difference between the existent position and the left and right ends is shorter than a predetermined value (usually there is hardly seen distance difference), the pointer is displaced to the left end if recording is effected in the rightward direction at present, while it is displaced to the right end if recording is effected in the leftward direction at present in order that recording is effected for the next line in the same direction as the existent one.

When the pointer abuts against the right margin of the ink ribbon during the recording operation for the next line while recording is effected in the bothway recording mode, the recording mode is shifted to the leftward direction mode and controlling is carried out in order to assure that no protrusion takes place in the rightward direction, as shown by the state (III).

When the pointer moves across the reference point 16 or abuts against the left margin 14 during the recording operation in the leftward direction, the leftward direction mode is canceled and the both-way recording mode is restored, as shown by the state (IV).

When the pointer moves beyond the left margin 14 of the ink ribbon during the recording operation for the next line in the both-way recording mode, the existent recording mode is shifted to the rightward direction mode.

When the pointer moves across the reference point 16 during the recording operation in the rightward direction mode, the rightward direction mode is cancelled and the both-way recording mode is restored, as shown by the state (V).

When the number of times of utilizations of any one of the sections reaches a first set number (8 times in the illustrated example) during the recording operation for the existent line in the both-way recording mode, the leftward direction mode is assumed, as shown by the state VI.

When the pointer moves across the reference point 16 or abuts against the left margin 14 of the ink ribbon during recording operation in the leftward direction mode, the leftward direction mode is cancelled and the both-way recording mode is restored (in the same manner as in the case of the foregoing state (IV)), as shown by the state (VII).

When the number of times of utilizations of any one of the sections reaches a second set number (11 times in the illustrated example) during recording operation in the both-way recording mode as shown by the state (VIII), the position of the last section at which the second set number is reached is stored. After completion of recording of the existent line the ribbon control table is so shifted that the thus stored position of the last section is located at the left margin (fore margin) and thereafter the empty section on the right side (rear side) is filled with zero (which means no utilization). Then, both-way recording (corresponding to the above-mentioned state (I)) is initiated again.

Incidentally, it is preferable that the second set number is selected to assume the same value as the number of recording operations for which the multi-ink ribbon can be repeatedly utilized as long as possible or a value which is close to the first-mentioned one.

Thus, recording is achieved in accordance with the steps as mentioned above while the ribbon control table is shifted at every time when the number of times of utilizations of any one of the sections reaches the second set number.

FIG. 5 is a block diagram which illustrates a control system for practicing the thermal recording method as described above.

Referring to FIG. 5, CPU (microprocessor) 20 in the recording apparatus is electrically connected to a host 21 such as computor, word processor or the like to receive printing data signal and necessary command signal.

CPU 20 is operatively connected to a motor 23 for driving the carriage 3, a motor 24 for transferring a sheet 2 (for driving the platen 1), a motor 25 for turning up and down the thermal head 4 and a motor 26 for driving the ink ribbon or means for actuating the ribbon winding mechanism to control them. Further, CPU 20 is adapted to activate dot forming means (heating elements 4a) in the thermal head 4 in response to signal transmitted via the host 21.

A recording operation is controlled in accordance with a program stored in ROM which is disposed adjacent to CPU 20.

Further, the RAM including the ribbon buffer and printing buffer as mentioned above is disposed adjacent to CPU 20.

As will be readily apparent from the above description, the serial type thermal recording method of the type using a multi-ink ribbon is so constructed that a ribbon control table is provided corresponding to a predetermined range on the ribbon, forward direction mode (rightward direction mode) and return direction mode (leftward direction mode) are employed in addition to both-way recording mode, recording is effected while properly changing the above-mentioned modes in dependence on recording conditions, the number of recording operations at each of the positions (sections) within a predetermined range on the ribbon is stored, and a new section on the ribbon is additionally used while shifting the ribbon control table at every time when the number of recording operations at any one of the positions reaches a set value (the number of times of recording operations for which the multi-ink ribbon can be repeatedly utilized as long as possible or the number of times which is close to the first-mentioned one) whereby recording operation is performed while controlling the number of utilizations. Thus, the method of the invention makes it possible to use each position on the multi-ink ribbon by the number of recording operations for which the multi-ink ribbon can be repeatedly used or the number of times which is close to the first-mentioned one without any necessity for return movement of the thermal head and moreover to perform a recording operation so that useless recording distance (useless scanning distance) of the thermal head is minimized.

It should be noted that in the illustrated embodiment the reference point is located at the position spaced rightward away from the left margin of the ink ribbon but it may be located at the same position as the left margin.

The serial type thermal recording method and apparatus of the type using a multi-ink ribbon which assure that the recording speed can be increased and loss in consumption of the ink ribbon can be minimized have been provided in that way.

As described above, the present invention can provide a serial type thermal recording method and apparatus which assure increased recording speed during use of the multi-ink ribbon.

Next, description will be made below as to another embodiment of the present invention.

This embodiment is concerned with thermal recording method and apparatus of the type using a multi-ink ribbon with the which recording operation can be repeatedly performed, wherein recording is effected while a thermal head is displaced along a sheet. The method of the present invention consists of the step of winding the multi-ink ribbon by a length corresponding to M/N of a line per recording of M lines, M being less than N in the both-way recording mode where N is the number of recording operations that can be performed by the ink ribbon. The method of the present invention assures increased speed of recording which is performed with the use of the multi-ink ribbon.

Incidentally, it is assumed that the same apparatus as illustrated in FIG. 1 is used and the same control block diagram as illustrated in FIG. 5 is employed to practice this embodiment.

In this embodiment the recording operation is performed in such a manner that the multi-ink ribbon is wound by a length corresponding to M/N of a line every time recording is achieved on the area covered by M lines in the both-way recording mode, where N is the number of recording operations for which a portion of the ink ribbon can be repeatedly used.

For instance, the setting may be so effected that N is in the range of 10 to 15 and M is in the range of 1 to 5.

Thus, the both-way recording operation (which is such that recording is effected by movement of the thermal head in both the forward and return directions) is performed without interruption and a new part of the ink ribbon is fed to the operative area in front of the thermal head by a distance M/N of a line every time recording is performed M times (by M lines).

Incidentally, as a method of winding the ink ribbon one may employ a method of causing the carriage 3 to return uselessly by M/N of a line distance in the case where movement of the carriage 3 is utilized or a method of excessively winding the ink ribbon by M/N of a line distance with the aid of an ink ribbon winding motor in the case where winding is effected by rotating the ribbon winding motor.

Figure 9:
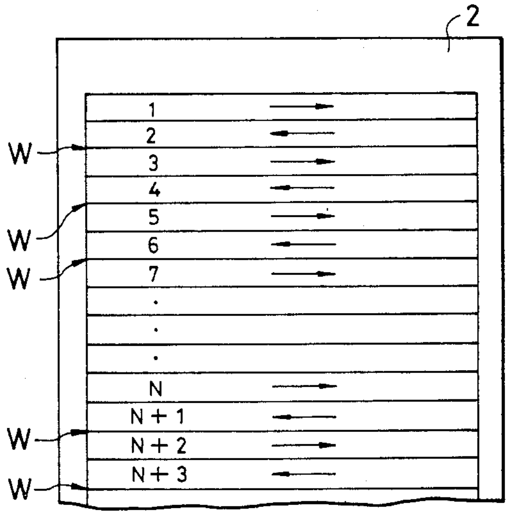
FIG. 9 is an illustrative view which exemplifies an operational mode of the recording method in accordance with the second embodiment of the present invention.

FIG. 9 is an illustrative view which exemplifies recording operations as mentioned above.

In the case illustrated in FIG. 9 each of the lines on the sheet 2 is recorded in the both-way recording mode while effecting full scanning (full width scanning). Every time when M lines (for instance, M=2) are recorded, assuming N (for instance, N=10) identifies the number of recording operations for which a portion of the multi-ink ribbon can be repeatedly used (that is, at every time when one both-way recording is achieved), the ink ribbon is wound by M/N of a line distance, that is, by a distance of 1/5 of one line. Accordingly, the ink ribbon is wound by a distance of 1/5 of one line at the position W every time both-way recording is performed whereby recording is effected while a new part of the ink ribbon in fed by the distance mentioned above.

In the case as illustrated in FIG. 9 M=2 is employed and this can be freely selected, provided that M is a certain value less than N. In the case where N=10 is employed any value within the range of 1 to 10 can be selected for M.

It should be noted that N and M may be either of odd number and even number and the position where the ink ribbon is wound is reversed as seen in the transverse direction in dependence of the fact that M is odd or even number.

As described above, this embodiment is practiced in such a manner that at every time when both-way recording is achieved with the use of a multi-ink ribbon on the area covered by M lines which follow the maximum number of times of utilizations of the multi-ink ribbon, the latter is wound by of a line distance and thereby a new part of the ink ribbon is additionally fed to the operative area. As a result, both-way recording can be continuously effected by the minimized winding operation and increased recording speed and improved performance of the multi-ink ribbon can be obtained.

Figure 10:
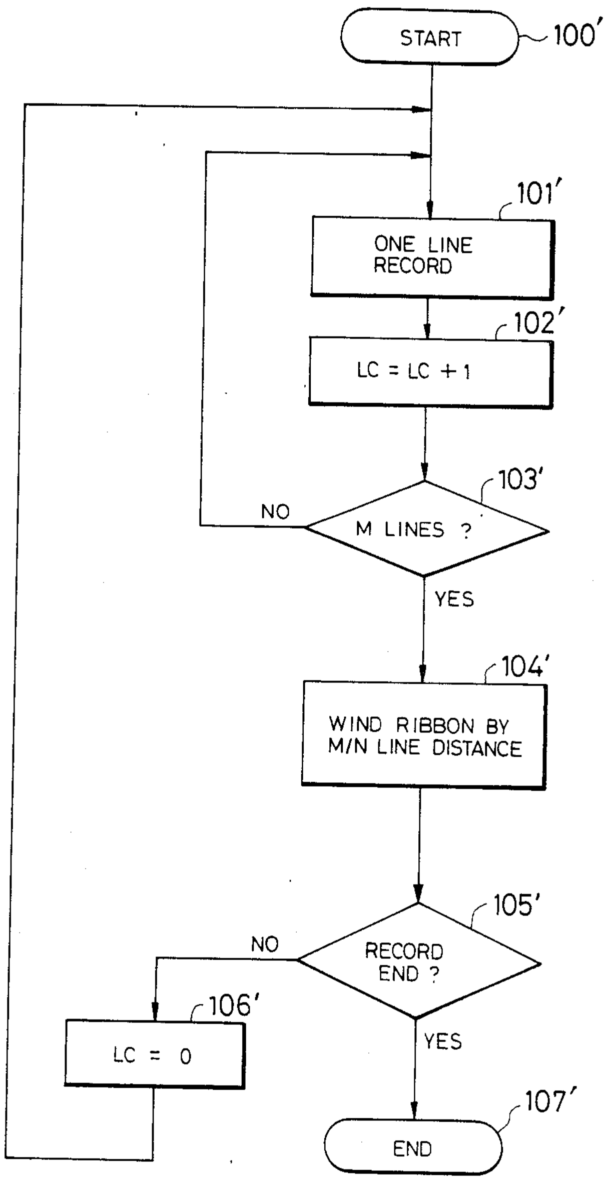
FIG. 10 is a flow chart similar to FIG. 6 which illustrates the steps of operations of the control system in FIG. 5.

FIG. 10 is a flow chart which illustrates the steps of the recording operations in the same control system as illustrated in FIG. 5.

Referring to FIG. 10, when both-way recording operation is initiated at Step 100', recording is achieved on one line in Step 101' and thereafter a counter for counting recorded lines counts up by one line at Step 102'. Then, one proceeds to Step 103' at which it is discriminated whether a set number of lines M is reached or not.

When it is found that the set number of lines fails to be reached, Step 101' is restored to continue both-way recording operation.

When it is found that the set number of lines M is reached, one proceeds to Step 104' whereby the multi-ink ribbon is wound by of a line distance.

Next, one proceeds to Step 105' at which it is discriminated whether recording operation is completed or not.

When it is found that recording operation is not completed, the counter is reset at Step 106' and thereafter Step 101' is restored to perform the both-way recording operation.

When it is found that recording operation is completed, man one proceeds to Step 107' at which the intended steps of operations are terminated.

As described above, this embodiment is practiced in such a manner that at every time when both-way recording is achieved with the use of a multi-ink ribbon on the area covered by M lines which follow the maximum number of times of utilization of the multi-ink ribbon the latter is wound by M/N of a line distance. As a result, advantageous effects of increased recording speed attributable to the minimized winding operation of the ink ribbon and high economical performance of the ink ribbon owing to utilization of the latter without any particular loss are obtainable.

Other advantageous effects of the present invention are that there is no necessity for manual handling for reversing of the ribbon cassette or the like, feeding of the ink ribbon is achieved automatically, and excellent maneuverability is assured.

As will be apparent from the above description, thermal recording method and apparatus which assure increased recording speed of a serial type thermal transfer recording apparatus in which a multi-ink ribbon is used and high economical performance of the ink ribbon have been provided in accordance with the embodiment of the present invention.

Next, description will be made below as to another embodiment of the present invention. This embodiment consists of performing recording on a recording sheet such as plain paper or the like with the use of a multi-ink ribbon as well as recording on a heat sensitive paper without any use of an ink ribbon whereby a recording apparatus for effectively performing recording operation in dependence on the kind of recording medium is provided.

This embodiment to be described below in more detail is concerned with a thermal recording apparatus of the type in which recording operation is performed while a thermal head is displaced along a sheet, wherein when a one time ink ribbon is fitted to the thermal head, this is detected to effect one-way recording and when a multi-ink ribbon is fitted thereto or no ink ribbon is fitted thereto, this is detected to effect both-way recording whereby thermal transfer recording with the use of a one time ink ribbon and a multi ink ribbon as well as heat sensitive type recording without any use of ink ribbon are effectively achieved in accordance with a selection carried out by a user.

Now, the present invention will be concretely described below with reference to FIGS. 11 to 17.

Figure 11:
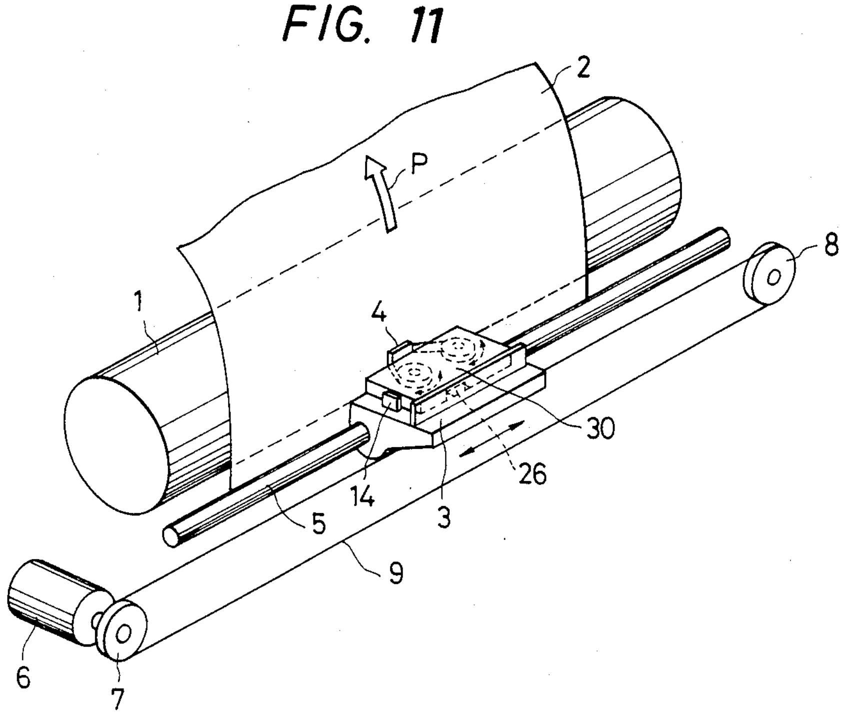
FIG. 11 is a fragmental perspective view of a thermal recording apparatus in accordance with another embodiment of the present invention.

FIG. 11 is a fragmentary perspective view similar to FIG. 1A and the same or similar members adapted to function in the same manner as those in FIG. 1A are identified by same reference numerals. Their repeated description will not be required.

In this embodiment a ribbon cassette (ink ribbon cassette for the purpose of thermal transfer recording) 30 adapted to feed an ink ribbon to the operative area in front of a recording head 4 is detachably mounted on the carriage 3.

The ribbon cassette 30 is used in the case where recording is achieved in accordance with a thermal transfer process. When thermal transfer recording is effected, a sheet of plain paper is used as a sheet 2 and recording operation is performed while the ink ribbon accommodated in the ribbon cassette 30 is wound by rotating a ribbon driving shaft (not shown) on the carriage 3.

A cassette 30A adapted to use a one time ink ribbon with which recording is achieved on the same area thereof only one time or a cassette 30B adapted to use a multi-ink ribbon with which recording operation is repeatedly performed on the same area (for instance, 10 times) is selected as a ribbon cassette 30. When a one time ink ribbon is used this is detected and one-way recording (for instance, recording only in the direction of movement of the carriage from the left to the right) is effected. On the other hand, when a multi-ink ribbon is used, this is detected and both-way recording (recording in both the directions of movement of the same from the left to the right and vice versa) is effected.

When recording operation is performed in accordance with the heat sensitive process, usually the ribbon cassette 30 is removed from the carriage 3 and a heat sensitive sheet (sheet adapted to exhibit a certain color under the effect of heating) is used as sheet 2. Recording is effected without any use of an ink ribbon while the thermal head 4 is brought in pressure contact directly with the sheet 2.

When recording is achieved without any use of an ink ribbon, that is, without any use of the ribbon cassette 30 or without any feeding of ink ribbon to the operative area in front of the thermal head 4, this is detected and controlling is so effected that both-way recording operation is performed.

During recording operation the thermal head 4 is displaced in the pressure contact state while the heating elements disposed thereon are activated in response to printing data signal. Line shifting is achieved by transferring the sheet 2 by a predetermined pitch in the direction as identified by an arrow mark P. Incidentally, in the case of one-way recording the thermal head 4 is caused to return to its home position at every time when recording is achieved one one line.

In the case of both-way recording with the use of a multi-ink ribbon and without any use of an ink ribbon, particularly in the case of both-way recording with the use of a multi-ink ribbon with which recording operation is performed repeatedly, the number of times of recording operations is limited within a certain one. For the reason it is preferable that both-way recording is effected in consideration of winding and unwinding of the ink ribbon in the both-way recording mode where return movement of the thermal head 4 is carried out by one time at every time when repeated recording operations are completed by the number of times of repetition of recording operations with the use of the multi-ink ribbon or the odd number of times (corresponding to the odd number of lines) which is close to the first-mentioned one.

Figure 12:
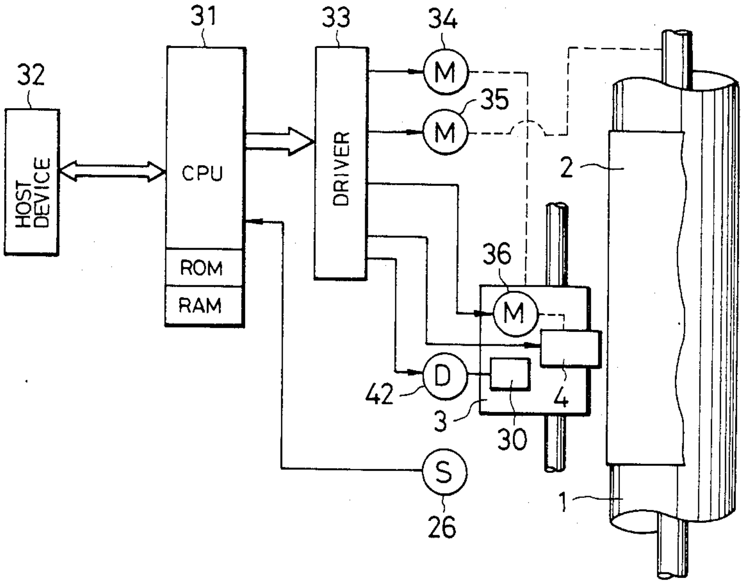
FIG. 12 is a block diagram illustrating a control system for the apparatus in FIG. 11.

FIG. 12 is a block diagram illustrating a control system for the thermal recording apparatus as shown in FIG. 11. Referring to FIG. 12, CPU(microprocessor) 31 in the recording apparatus is electrically connected to a host 32 such as computer, word processor or the like to receive printing data signal and a necessary command signal therefrom. CPU 31 is operatively connected to a motor 34 for driving the carriage 3, a motor 35 for driving the transfer roller (serving as a platen) 1 for a sheet 2, a motor 36 for turning up and down the thermal head 4 and a motor 42 for driving an ink ribbon or means for shifting driving of the ink ribbon from the normal direction to the reverse direction and vice versa via, and a driver (driving circuit) 33 to control them in the driving system. Moreover, CPU 31 is adapted to activate dot forming means (heating elements) in the thermal head 4 in response to printing data signal transmitted from the host 32.

The carriage 3 is equipped with cassette detecting means 26 for discriminating two operative states, one of them being such that a ribbon cassette 30A with a one time ink ribbon accommodated therein is loaded on the carriage 3 and the other one being such that a ribbon cassette 30B with a multi-ink ribbon accommodated therein is loaded thereon or no ribbon cassette is loaded thereon. A detected signal (usually, ON signal is represented by numeral 1 and OFF signal is represented by numeral 0) is transmitted to CPU 31.

Figure 13:
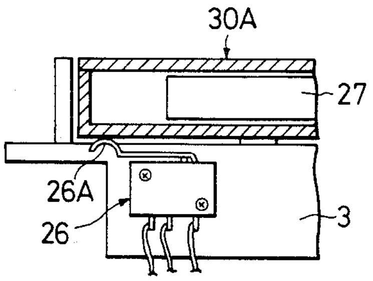
FIGS. 13 to 15 are fragmentary sectional front views of a ribbon cassette mounted on the carriage respectively, particularly illustrating how the cassette detecting means as shown in FIG. 12 functions.
Figure 14:
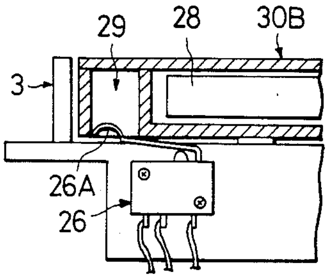
Figure 15:
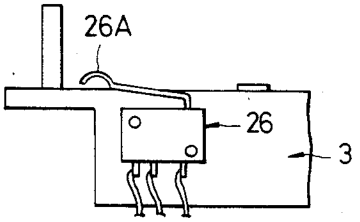

FIGS. 13 to 15 illustrate how the cassette detecting means 26 is constructed and how it functions. In the illustrated example the cassette detecting means 26 is constituted by a single microswitch which is attached to the carriage 3.

FIG. 13 illustrates that the ribbon cassette 30A with a one time ink ribbon 27 accommodated therein is loaded on the carriage 3. In this case a contact piece 26A on the microswitch 26 is depressed by the bottom surface of the ribbon cassette 30A whereby the microswitch 26 is turned on.

FIG. 14 illustrates that the ribbon cassette 30B with a multi-ink ribbon 28 accommodated therein is loaded on the carriage 3. In this case the contact piece 26A on the microswitch 26 is kept in the freely released state and thereby the microswitch 26 is turned off.

FIG. 15 illustrates that no ribbon cassette is loaded on the carriage 3. In the case the contact piece 26A on the microswitch 26 is kept in the freely released state in the same manner as in the case as shown in FIG. 14 and thereby the microswitch is turned off.

Figure 17:
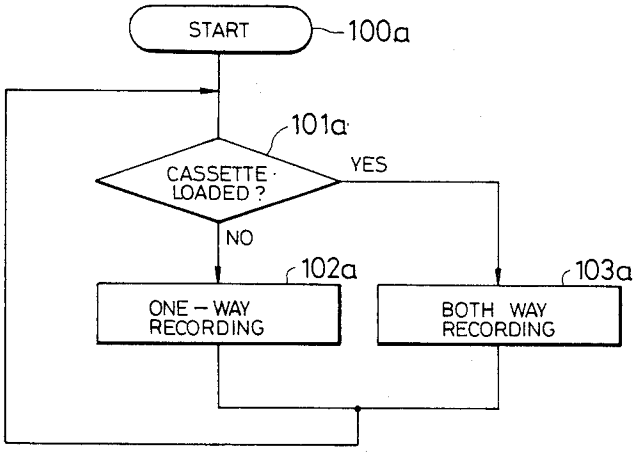
FIG. 17 is a flow chart similar to FIGS. 6 and 10 which illustrates the steps of operations of the control system in FIG 12.

As shown in FIG. 14, the ribbon cassette 30B having the multi-ink ribbon 28 accommodated therein is formed with a hole 29 into which the contact piece 26A enters. To this end, for instance, the ribbon cassette 30B may have a removable portion 41 at the one corner of the bottom wall as illustrated in FIG. 17, the removable portion 41 being removed from the bottom wall by bending operation. When the ribbon cassette 30A for an one time ink ribbon is loaded on the carriage 3, its bottom wall having the removable portion 41 formed thereon is placed thereon as it is, that is, without any occurrance of removal of the removable portion 41. On the other hand, when the ribbon cassette 30B for a multi-ink ribbon is loaded on the carriage 3, the removable portion 41 is removed from the bottom wall by bending operation to form a square hole 29. As a result, one kind of cassette case can be used for both the ribbon cassettes 30A and 30B, resulting in cost saving being assured.

In the illustrated example the same recording mode as in the case when the ribbon cassette 30B with the hole 29 formed therein is loaded on the carriage 3 can be obtained even when no ribbon cassette is loaded thereon.

Specifically, when the ribbon cassette 30A with the one time ink ribbon 27 accommodated therein is loaded on the carriage 3 (see FIG. 13), the microswitch 26 is turned on and this operative state is discriminated by CPU 31 whereby one-way recording operation (movement of the thermal head 4 only in the one direction from the left to the right or from the right to the left) is performed. When the ribbon cassette 30B with the multi-ink ribbon 28 accommodated therein is loaded on the carriage 3 (see FIG. 14) or when no ink ribbon is loaded thereon (see FIG. 15), the microswitch 26 is turned off and this operative state is discriminated by CPU 31 whereby both-way recording operation (movement of the thermal head 4 in both the directions from the left to the right and vice versa) is performed.

It should be noted that when the ribbon cassette 30A or 30B is loaded on the carriage 3 (see FIGS. 13 and 14), recording is achieved in accordance with the thermal transfer process using plain sheet material, while when no ribbon cassette is loaded thereon (see FIG. 15), recording is achieved in accordance with the heat sensitive process using heat sensitive sheet material.

The recording operation as mentioned above is performed in accordance with a program stord in ROM which is disposed adjacent to CPU 20.

FIG. 17 is a flow chart which exemplifies the steps of operations to be performed by the control system as illustrated in FIGS. 12 to 16.

Referring to FIG. 17, when the recording apparatus is activated in Step 100*a*, one proceeds to Step 101*a* at which it is discriminated whether any ribbon cassette 30 is loaded or not. As a result of discrimination made in that way a ribbon cassette 30B for a multi-ink ribbon 28 with a hole 29 formed therein as shown in FIG. 14 is loaded on the carriage 3. When it is found that the microswitch 26 is kept in the free state (that is, it is turned off), it is discriminated that no ribbon cassette is loaded thereon.

When a ribbon cassette 30A with an one time ink ribbon 27 accommodated therein is loaded on the carriage 3 and it is discriminated at Step 101*a* that any ribbon cassette is loaded thereon, one proceeds to Step 102*a* at which one-way recording is effected in accordance with the thermal transfer process.

When a ribbon cassette 30B with a multi-ink ribbon 28 accommodated therein is loaded on the carriage 3 or no ribbon cassette is loaded thereon and it is discriminated at Step 101*a* that any ribbon cassette is not loaded thereon, one proceeds to Step 103*a* at which both-way recording is effected.

Step 101*a* is restored while maintaining a predetermined timing relation relative to Steps 102*a* and 103*a* and the steps of operations as mentioned above are repeated.

As described above, the embodiment of the present invention consists in that thermal transfer recording with the use of a one time ink ribbon which is suitable for one-way recording and of which recording speed is kept at a lower level, thermal transfer recording with the use of a multi-ink ribbon, which makes it possible to effect both-way recording (high speed recording) and heat sensitive recording without any use of an ink ribbon are selectively shifted from one to another in consideration of the recording mode suitable for the employed type of recording and recording operation can be performed in accordance with any type of recording process without any reduction of recording speed and printing quality. As a result, the application field of the recording apparatus can be enlarged.

As will be apparent from the above description, the embodiment of the present invention has provided a thermal recording apparatus which assures that recording can be achieved without any reduction of recording speed and printing quality by employing one of a variety of recording modes in dependence on the kind of ink ribbon and whether an ink ribbon is used or not.

Finally, description will be made below as to further another embodiment of the present invention with reference to FIGS. 18 to 23.

The embodiment of the present invention to be described below is intended to provide a thermal recording apparatus of the type in which recording is effected while a thermal head is displaced along a sheet to be recorded, wherein when a ribbon cassette with a one time ink ribbon accommodated therein is loaded on the carriage, this fact is detected to effect one-way recording, when a ribbon cassette with a multi-ink ribbon accommodated therein is loaded thereon, this fact is detected to effect irregular both-way recording in consideration of winding of the ink ribbon, and when any ribbon cassette is not loaded thereon, this fact is detected to effect complete both-way recording whereby any one of thermal transfer recording with the use of a one time ink ribbon, thermal transfer recording with the use of a multi-ink ribbon, and heat sensitive type recording can be effectively achieved in compliance with the selection of a user.

Figure 19:
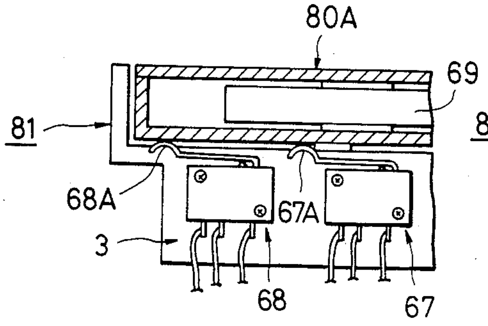
FIGS. 19 to 21 are fragmentary sectional front views of a ribbon cassette mounted on the carriage similar to FIGS. 13 to 15 respectively, particularly illustrating how switches for detecting the existence or absense of the ribbon cassette and the kind of the latter as shown in FIG. 18 function.
Figure 20:
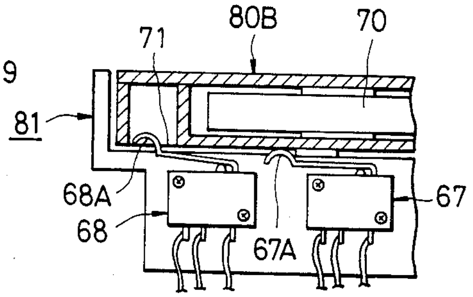
Figure 21:
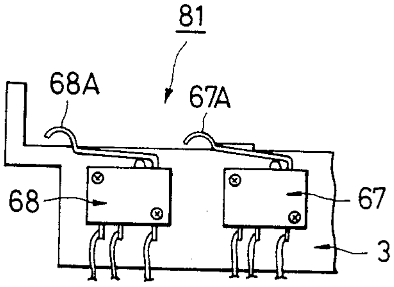

Now, the embodiment of the present invention will be concretely described below with reference to FIGS. 18 to 23. The thermal recording apparatus in accordance with this embodiment is substantially same to the apparatus as shown in FIG. 11 with the exception of a control system and a carriage portion. In view of this fact only the carriage portion is illustrated in FIGS. 19 to 21 and other parts constituting the apparatus are same as those in FIG. 11.

In this embodiment a ribbon cassette 80A or 80B for feeding an ink ribbon to the operative area in front of the recording head 4 is detachably loaded on the carriage 81.

The ribbon cassette 80A or 80B is used in the case where recording is effected in accordance with the thermal transfer process. When thermal transfer recording operation is performed, plain sheet material is used as a sheet 2 and recording is effected while an ink ribbon in the ribbon cassette is wound about a ribbon driving shaft (not shown) on the carriage 81 by rotating the ribbon driving shaft in the predetermined direction.

Ribbon cassette 80A with the use of a one time ink ribbon adapted to effect recording on the same area only a single time or ribbon cassette 80B with the use of a multi-ink ribbon adapted to repeatedly effect recording on the same area (for instance, by 10 times) is selectively loaded on the carriage 81 as the ribbon cassette.

When recording operation is performed in accordance with the heat sensitive recording process, the ribbon cassette is removed from the carriage 3 to assume the operative state where no ink ribbon is used and recording is then achieved without any use of ink ribbon by allowing the thermal head 4 to come in pressure contact directly with a heat sensitive sheet 2 (sheet material adapted to exhibit a certain color under the effect of heating) which is employed in place of plain sheet material.

During recording operation the thermal head 4 is displaced along the heat sensitive sheet 2 while the heating elements on the thermal head 4 are activated in response to printing data signal at every time when it is brought in pressure contact with the sheet 2. After completion of recording operation, line shifting is achieved by transferring the sheet 2 by a predetermined pitch in the direction as identified by an arrow mark P. It should be added that in the case of one-way recording the thermal head 4 is caused to return to its home position at every time when recording operation is completed by one line.

According to the embodiment of the present invention, the recording operation is so controlled that when a ribbon cassette with a one time ink ribbon accommodated therein is loaded on the carriage, this fact is detected to effect one-way recording (recording which is effected while the thermal head 4 is displaced only in the one direction from the left to the right or from the right to the left), when a ribbon cassette with a multi-ink ribbon accommodated therein is loaded thereon, this fact is detected to effect irregular both-way recording (recording which is effected in both the directions, that is, in the leftward and rightward direction accompanied by return movement of the thermal head 4) in consideration of winding operation of the ink ribbon, and when no ribbon cassette is loaded thereon or no ink ribbon is fed to the operative area in front of the thermal head 4, this fact is detected to effect complete both-way recording (recording which is effected in both the directions without any necessity for return movement of the thermal head 4 during recording operation).

In view of the fact that the number of repeated recording operations of a multi-ink ribbon is limited (for instance, 10 times), the above-mentioned irregular both-way recording is practiced in consideration of the winding operation of the ink ribbon in accordance with such a recording mode that the thermal head 4 is caused to return one time at every time when recording is achieved by the number of recording operations for which the multi-ink ribbon can be repeatedly used or by the odd number of recording operations (times of the recording operations on the odd number of lines) which is close to the first-mentioned number.

Figure 18:
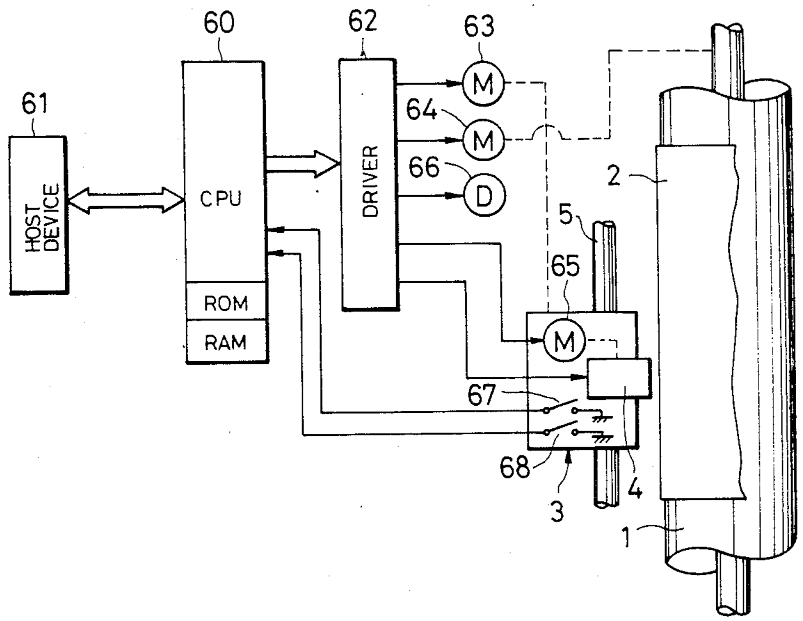
FIG. 18 is a block diagram illustrating a control system for a recording apparatus in accordance with another embodiment of the present invention.

FIG. 18 is a block diagram illustrating a control system for a thermal recording apparatus in accordance with the embodiment of the present invention.

Referring to FIG. 18, CPU (microprocessor) 60 in the recording apparatus is electrically connected to a host 61 such as computer, word processor or the like to receive printing data signal and other necessary command signal therefrom.

CPU 60 is operatively connected to a motor 63 for driving the carriage 3, a motor 64 for transferring a sheet 2 (for driving a transferring roller 1), a motor 65 for turning up and down the thermal head 4 and a motor 66 for driving an ink ribbon or a device for changing the direction of winding of the ink ribbon via a driver (driving circuit) 62 to control them in the control system. Further, CPU 60 is adapted to activate dot forming means (heating elements) in the thermal head 4 in response to printing data signal transmitted from the host 61.

The carriage 3 is provided with a first switch 67 for detecting whether the ribbon cassette 80 is loaded thereon or not and a second switch 68 for detecting the kind of the ribbon cassette 80, that is, for detecting whether the latter is used for a one time ink ribbon or a multi-ink ribbon. A signal (ON signal or OFF signal) from each of the switches 67 and 68 is transmitted to CPU 60.

FIGS. 19 and 21 illustrate how the first and second switches 67 and 68 are loaded on the carriage 3 and how they function.

Specifically, FIG. 19 illustrates that the ribbon cassette 80A with a one time ink ribbon 69 accommodated therein is loaded on the carriage 3. In this case contact pieces 67A and 68A of both the first and second switches 67 and 68 are depressed by the bottom wall of the cassette case and thereby both the switches 67 and 68 are turned on.

Thus, it is detected by the fact that the first switch 67 is turned on that a ribbon cassette is loaded on the carriage 3 and moreover it is detected by the fact that the second switch 68 is turned on that the thus loaded cassette is a ribbon cassette 80A for a one time ink ribbon.

FIG. 20 illustrates that the ink ribbon cassette 80B for a multi-ink ribbon 70 is loaded on the carriage 3. As is apparent from the drawing, the ribbon cassette 80B is formed with a hole 71 into which the contact piece 68A of the second switch 68 enters.

Accordingly, the first switch 67 is turned on due to the fact that its contact piece 67A is depressed, while the second switch 68 is turned off due to the fact that its contact piece 68A is kept in the freely released state.

Thus, it is detected by the fact that the first switch 67 is turned on that a ribbon cassette is loaded on the carriage 3 and moreover it is detected by the fact that the second switch 68 is turned on that the thus loaded ribbon cassette is a ribbon cassette 80B for a multi-ink ribbon 70.

FIG. 21 illustrates that no ribbon cassette is loaded on the carriage 3. In this case both the contact pieces 67A and 68A of the first and second switches 67 and 68 are kept in the freely released state and thereby both the first and second switches 67 and 68 are turned on.

Accordingly, it is detected by the fact that the first switch 67 is turned off that no ribbon cassette is loaded on the carriage 3.

Figure 22:
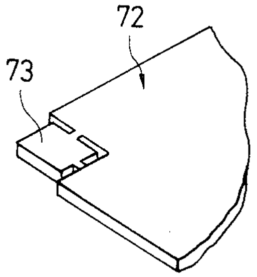
FIG. 22 is a fragmentary perspective view of the bottom wall of the ribbon cassette in FIG. 19, particularly illustrating how a removable portion adapted to form a hole is provided thereon.

To form the hole 71 in the ribbon cassette 80B for the multi-ink ribbon 70, for instance, a method as illustrated in FIG. 22 may be employed. Specifically, the bottom wall of the cassette case 72 is previously formed with a removable portion 73 at one corner thereof. In the case where the one time ink ribbon 69 is accommodated in the cassette case 72, the bottom wall of the latter is used as it is and in the case where the multi-ink ribbon 70 is accommodated in the cassette case 72, the removable portion 73 is removed from the bottom wall by a bending operation so that the hole 71 is produced. By employing the method as mentioned above both the ribbon cassettes 80A and 80B can be provided by using a single kind of cassette case.

When the ribbon cassette 80A with the one time ink ribbon 69 accommodated therein is loaded on the carriage 3 (see FIG. 19), the first switch 67 is turned on and the second switch 68 is also turned on. This fact is detected and the result of detection is discriminated by CPU 60 so as to allow one-way recording to be effected. Namely, recording operation is performed while the thermal head is displaced only in the one direction, that is, from the left to the right or from the right to the left.

When the ribbon cassette 80B with the multi-ink ribbon 70 accommodated therein is loaded on the carriage 3 (see FIG. 20), the first switch 67 is turned on and the second switch 68 is turned off. This fact is detected and the result of detection is discriminated by CPU 60 so as to allow irregular both-way recording to be effected in consideration of winding operation of the ink ribbon. As mentioned above, the irregular both-way recording mode is so designed that the thermal head 4 is caused to return by a distance of one line at every time when recording operations are performed by 9 times (on 9 lines) on the assumption that the number of recording operations for which the multi-ink ribbon 70 can be repeatedly used amounts to 10 and thereafter the ink ribbon is wound gradually.

When no ribbon cassette is loaded on the carriage 3 (see FIG. 21), the first switch 67 is turned off. This fact is detected and the result of detection is discriminated by CPU 60 so as to allow complete both-way recording to be effected. The complete both-way recording mode means both-way recording which does not require return movement of the thermal head 4 in the course of recording operation. Accordingly, recording operation is continuously performed during reciprocable movement of the thermal head 4.

It should be noted that when the ribbon cassettes 80A and 80B are loaded on the cartridge 3 respectively (see FIGS. 19 and 20), recording is achieved in accordance with the thermal transfer process by using plain sheet material and when no ribbon cassette is loaded thereon (see FIG. 21), recording is achieved by using heat sensitive sheet material.

Recording operation as mentioned above is performed in accordance with a program stored in ROM which is disposed adjacent to CPU 60.

Figure 23:
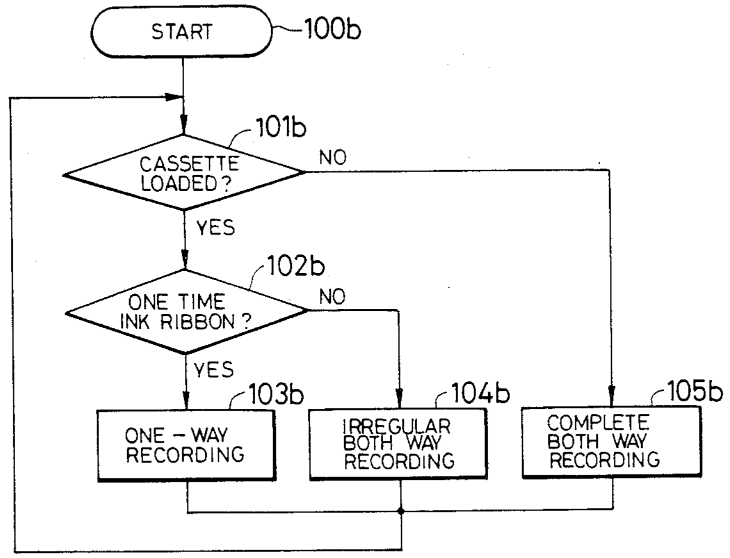
FIG. 23 is a flow chart similar to FIGS. 6, 10 and 17 which illustrates the steps of operations of the control system in FIG. 18.

FIG. 23 is a flow chart illustrating the steps of operations of the control system as shown in FIGS. 18 to 22.

Referring to FIG. 23, when the recording operation starts its operation at Step 100*b*, one proceeds to Step 101*b* at which it is discriminated whether the ribbon cassettes 80A and 80B are loaded or not.

When it is discriminated that either of them is loaded, one proceeds to Step 102*b* at which it is discriminated whether the thus loaded ribbon cassette is used for a one time ink ribbon or for a multi-ink ribbon. When it is found that it is intended to be in use for a one time ink ribbon, one proceeds to Step 103*b* at which one-way recording is achieved. When it is found that it is in use for a multi-ink ribbon, one proceeds to Step 104B at which irregular both-way recording is achieved.

When it is discriminated at Step 101*b* that no ribbon cassette is loaded on the carriage, one proceeds to Step 105*b* at which complete both-way recording is achieved.

During recording operation at Steps 103*b* to 105*b* Step 101*b* is restored in accordance with a predetermined timing relation and thereafter the steps of operations as mentioned above are carried out repeatedly.

As described above, the embodiment of the present invention is so practiced that three types of recording, that is, thermal transfer recording which is suitable for one-way recording due to usage of the one time ink ribbon 69 and operational speed is comparatively low, thermal transfer recording which is suitable for irregular both-way recording due to usage of the multi-ink ribbon 70 and of which the operational speed is high, and heat sensitive recording with is suitable for complete both-way recording due to no usage of any ink ribbon and of which the operational speed is high, are automatically controlled in accordance with a recording mode which is suitably employed for one of the above-mentioned three types of recording. Thus, advantageous effects of the embodiment of the present invention are that recording operation can be freely performed in accordance with any type of recording mode selected in that way without any occurrence of reduction of recording speed and degrading of printing quality and application field of the above-mentioned types of recording operations can be enlarged.

As will be apparent from the above description, the embodiment of the present invention has provided a thermal recording apparatus which assures that recording operation is performed without any occurrence of reduction of recording speed and degrading of printing quality in accordance with a proper recording mode which is automatically selected in dependence on the kind of ink ribbon and existence or absence of ink ribbon.

In the foregoing embodiment a microswitch is used as detecting means. However, the present invention should not be limited only to this type of detecting means. Alternatively, an optical sensor or like means may be employed as detecting means, as required.

It should be noted that in each of the above-described embodiments of the present invention the heating temperature and the heating time of the thermal head are properly controlled by the CPU in dependence on the kind of recording medium to be used (for instance, plain paper, heat sensitive paper, plastic sheet usable for OHP or the like). Further, it should be noted that an ink sheet having narrow width or wide width can be used as required and any known kind of ink can be used as required.

Thus, the present invention has provided recording method and apparatus which assure that image recording can be effectively achieved on recording medium by using a multi-ink sheet.

While the present invention has been described above with respect to several preferred embodiments whereof, it should of course be understood that it should not be limited only to them but various changes or modifications may be made in any acceptable manner without departure from the spirit and scope of the invention as defined by the appended claims.

We claim:

1. A method of thermal recording on a recording medium, using a reusable sheet containing ink which is usable for producing multiple recordings by transferring the ink from the reusable sheet onto the recording medium, comprising the steps of:

forwarding heating means for heating the reusable sheet, along the recording medium as the reusable sheet is unwound and returning the heating means, along the recording medium as the reusable sheet is rewound while recording is conducted upon both the forwarding and the returning of the heating means;

stopping the recording operation when recognizing means for recognizing the number of recordings made recognizes the returning of the heating means at a predetermined time, and then returning the heating means to a start position without movement of the reusable sheet; and repeating the above steps.

2. A thermal recording apparatus for thermal recording on a recording medium, using a reusable sheet containing ink which is usable for producing multiple recordings by transferring the ink onto the recording medium, comprising:

heating means for heating the reusable sheet to effect recording on the recording medium;

first moving means for reciprocably moving said heating means along the recording medium;

second moving means for unwinding and rewinding the reusable sheet;

recognizing means for recognizing the number of recordings made by the reusable sheet on the recording medium; and control means for controlling said first moving means and said second moving means such that said heating means is forwarded along the recording medium as the reusable sheet is unwound and returned along the recording medium as the reusable sheet is rewound while recording is conducted upon both the forwarding and the returning of said heating means, wherein said control means stops the recording when said recognizing means recognizes the returning of said heating means at a predetermined time and returns the heating means to a start position without movement of the reusable sheet and wherein said control means then repeats the forwarding and returning of said heating means and the stopping of the recording.

3. A method of thermal recording on a recording sheet, using a reusable ribbon reusable for producing multiple recordings by transferring the ink of the reusable ribbon onto the recording sheet, comprising the steps of:

providing a memory having ribbon control table comprising a plurality of sections corresponding to a plurality of portions within a predetermined range on the reusable ribbon and including fore and rear margins and a reference point;

performing recording operations at the plurality of portions of the reusable ribbon while changing the existing recording mode to another recording mode selected from a both-way recording mode, a forward direction recording mode, and a return direction recording mode depending on recording conditions, wherein the recording operation is not performed at the portion of the reusable ribbon corresponding to the fore margin of the ribbon control table;

storing data representing the number of recording operations performed at each of said portions of the reusable ribbon as a number associated with each of said sections; and shifting any one of said sections to assume the position of the fore margin when the number of recording operations performed at a portion of the reusable ribbon corresponding to said any one of said sections in the ribbon control table reaches a predetermined number.

4. A method of thermal recording on a recording medium, using a reusable ribbon which is reusable for producing multiple recordings by transferring the ink of the reusable ribbon onto the recording medium, wherein N is defined as the number of recording operations that can be performed with the same portion of the reusable ribbon, wherein said method comprises the steps of:

storing data corresponding to the number N; and winding said reusable ribbon by a length corresponding to M/N of a line when M lines on the recording medium are recorded by the reusable ribbon by both-way recording when M is less than N.

* * * * *

UNITED STATES PATENT AND TRADEMARK OFFICE
CERTIFICATE OF CORRECTION

PATENT NO. : 4,760,405

DATED : July 26, 1988

INVENTOR(S) : KEIJI NAGIRA, ET AL.

It is certified that error appears in the above-identified patent and that said Letters Patent is hereby corrected as shown below: Title page:

AT [57] IN THE ABSTRACT

Line 8, "direction" should read --directions,--.

COLUMN 1

Line 14, "facsmile" should read --facsimile--.
Line 24, "facsmile" should read --facsimile--.

COLUMN 3

Line 34, "other" should read --another--.

COLUMN 4

Line 15, "a" should be deleted.

COLUMN 7

Line 38, "The" should read --When the--.
Line 48, "computor," should read --a computer,--.

COLUMN 8

Line 6, "reaches" should read --has reached--.
Line 7, "reaches" should read --has reached--.
Line 61, "helon" should read --below--.

COLUMN 10

Line 44, "bothway" should read --both-way--.

UNITED STATES PATENT AND TRADEMARK OFFICE
CERTIFICATE OF CORRECTION

PATENT NO. : 4,760,405
DATED : July 26, 1988
INVENTOR(S) : KEIJI NAGIRA, ET AL.

It is certified that error appears in the above-identified patent and that said Letters Patent is hereby corrected as shown below:

COLUMN 11

Line 38, "computor," should read --a computer,--.

COLUMN 12

Line 36, "the which" should read --which the--.

COLUMN 13

Line 38, "by of" should read --by M/N of--.
Line 59, "by of" should read --by M/N of--.
Line 67, "man" should be deleted.

COLUMN 15

Line 33, "one one line" should read --on one line--.
Line 64, "via" should be deleted.

COLUMN 16

Figure 16:
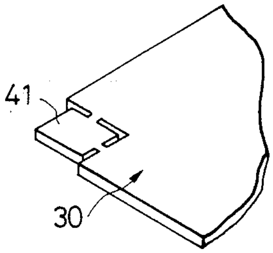
FIG. 16 is a fragmentary perspective view of the bottom wall of the ribbon cassette in FIG. 13, particularly illustrating how a removable portion adapted to form a hole is provided thereon.

Line 37, "FIG. 17," should read --FIG. 16,--.
Line 39, "for an" should read --for a--.

COLUMN 17

Line 10, "stord" should read --stored--.
Line 26, "an one" should read --a one--.
Line 64, "further" should be deleted.

UNITED STATES PATENT AND TRADEMARK OFFICE
CERTIFICATE OF CORRECTION

PATENT NO. : 4,760,405

DATED : July 26, 1988

INVENTOR(S) : KEIJI NAGIRA, ET AL.

It is certified that error appears in the above-identified patent and that said Letters Patent is hereby corrected as shown below:

COLUMN 18

Line 9, "any" should read --a--.
Line 20, "same to" should read --the same as--.

COLUMN 22

Line 23, "whereof," should read --thereof,--.

Signed and Sealed this

Thirteenth Day of December, 1988

*Attest:*

DONALD J. QUIGG

*Attesting Officer*

*Commissioner of Patents and Trademarks*